(12) United States Patent
Moura et al.

(10) Patent No.: US 9,759,292 B2
(45) Date of Patent: Sep. 12, 2017

(54) TENSIONING RAIL, AND TRACTION MECHANISM DRIVE INCLUDING SUCH A TENSIONING RAIL

(71) Applicant: Schaeffler Technologies AG & Co. KG, Herzogenaurach (DE)

(72) Inventors: Carlos Moura, Sorocaba (BR); Cesar Almeida, Sorocaba (BR); Daniel dos Anjos Sayao, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/038,684

(22) PCT Filed: Sep. 23, 2014

(86) PCT No.: PCT/DE2014/200494
§ 371 (c)(1),
(2) Date: May 23, 2016

(87) PCT Pub. No.: WO2015/074650
PCT Pub. Date: May 28, 2015

(65) Prior Publication Data
US 2016/0290446 A1  Oct. 6, 2016

(30) Foreign Application Priority Data
Nov. 25, 2013 (DE) .......................... 10 2013 224 007

(51) Int. Cl.
*F16H 7/08* (2006.01)
*F16H 7/18* (2006.01)
(Continued)

(52) U.S. Cl.
CPC ................. *F16H 7/08* (2013.01); *F16H 7/02* (2013.01); *F16H 7/06* (2013.01); *F16H 7/18* (2013.01);
(Continued)

(58) Field of Classification Search
CPC ...... F16H 2007/0872; F16H 7/18; F16H 7/08; F16H 2007/0893; F16H 2007/185
(Continued)

(56) References Cited

U.S. PATENT DOCUMENTS 4,826,468 A * 5/1989 Friedrichs ................. F16H 7/08
474/101
4,832,664 A * 5/1989 Groger ...................... F01L 1/02
123/90.15
(Continued)

*Primary Examiner* — Henry Liu
(74) *Attorney, Agent, or Firm* — Davidson, Davidson & Kappel, LLC

(57) ABSTRACT

A tensioning rail (2) for tensioning an endlessly circulating tensioner (4) is provided, wherein the tensioning rail (2) for tensioning the ternsioner (4) is curved in a longitudinal direction (L), the tensioning rail (2) has a base wall (6) and two jaws (8) protruding from the base wall (6), and the tensioning rail (2) has at least one U-shaped profiled segment (10) and a T-shaped profiled segment (12), which are each formed by the base wall (6) and the jaws (8), wherein the tensioning rail (2) includes a guiding element (14) for a rotary bearing (16) in the U-shaped profiled segment (10) and a guiding element (18) for a contact bearing (20) in the T-shaped profiled segment (12).

8 Claims, 2 Drawing Sheets

(51) Int. Cl.
*F16H 7/02* (2006.01)
*F16H 7/06* (2006.01)
(52) U.S. Cl.
CPC ............... *F16H 2007/0872* (2013.01); *F16H 2007/0893* (2013.01); *F16H 2007/185* (2013.01)
(58) Field of Classification Search
USPC .......................................................... 474/111
See application file for complete search history.

(56) References Cited

U.S. PATENT DOCUMENTS

| | | | | |
|---|---|---|---|---|
| 5,045,032 A * | 9/1991 | Suzuki | ...................... | F16H 7/08 474/140 |
| 5,318,482 A * | 6/1994 | Sato | .......................... | F16H 7/08 474/111 |
| 5,813,935 A * | 9/1998 | Dembosky | ................ | F16H 7/18 474/111 |
| 5,846,150 A * | 12/1998 | Wigsten | .................... | F16H 7/18 474/111 |
| 6,013,000 A * | 1/2000 | Moretz | ..................... | F16H 7/08 474/111 |
| 6,086,498 A * | 7/2000 | Hashimoto | ............... | F16H 7/08 474/111 |
| 6,302,816 B1 * | 10/2001 | Wigsten | .................... | F16H 7/18 474/111 |
| 6,601,473 B2 * | 8/2003 | Suzuki | ..................... | F16H 7/18 474/110 |
| 6,623,391 B2 * | 9/2003 | Young | ..................... | F16H 7/08 474/101 |
| 6,645,102 B2 * | 11/2003 | Kumakura | ................ | F16H 7/18 474/111 |
| 6,669,590 B2 * | 12/2003 | Kawano | ................... | F16H 7/18 474/111 |
| 6,758,777 B2 * | 7/2004 | Young | ..................... | F16H 7/18 474/111 |
| 6,832,966 B2 * | 12/2004 | Kawano | ................... | F16H 7/18 474/111 |
| 6,835,149 B2 * | 12/2004 | Konno | ..................... | F16H 7/08 474/111 |
| 6,849,013 B2 * | 2/2005 | Konno | ..................... | F16H 7/18 474/111 |
| 6,939,259 B2 * | 9/2005 | Thomas | .................... | F16H 7/18 474/111 |
| 6,969,331 B2 * | 11/2005 | Konno | ..................... | F16H 7/18 474/111 |
| 7,056,243 B2 * | 6/2006 | Konno | ..................... | F16H 7/18 474/111 |
| 7,074,145 B2 * | 7/2006 | Konno | ..................... | F16H 7/18 474/111 |
| 7,252,609 B2 * | 8/2007 | Hashimoto | ............... | F16H 7/18 474/111 |
| 7,476,169 B2 * | 1/2009 | Konno | ..................... | F16H 7/18 474/111 |
| 7,967,708 B2 * | 6/2011 | Hayami | ................... | F16H 7/18 474/111 |
| 8,747,263 B2 * | 6/2014 | Konno | ..................... | F16H 7/18 474/111 |
| 8,876,642 B2 * | 11/2014 | Adams | ..................... | F16H 7/18 474/111 |
| 8,888,628 B2 * | 11/2014 | Konno | ..................... | F16H 7/18 474/111 |
| 8,992,358 B2 * | 3/2015 | Adams | ................. | B21D 26/033 474/111 |
| 9,086,121 B2 * | 7/2015 | Mori | ........................ | F16H 7/18 474/111 |
| 2002/0077204 A1 * | 6/2002 | Kumakura | ................ | F16H 7/18 474/140 |
| 2008/0153643 A1 * | 6/2008 | Franke | ..................... | F16H 7/18 474/111 |
| 2009/0011879 A1 * | 1/2009 | Sakamoto | ................. | F16H 7/18 474/111 |
| 2011/0306449 A1 * | 12/2011 | Adams | ..................... | B21D 26/033 474/111 |
| 2012/0015769 A1 * | 1/2012 | Adams | ..................... | F16H 7/18 474/140 |

* cited by examiner

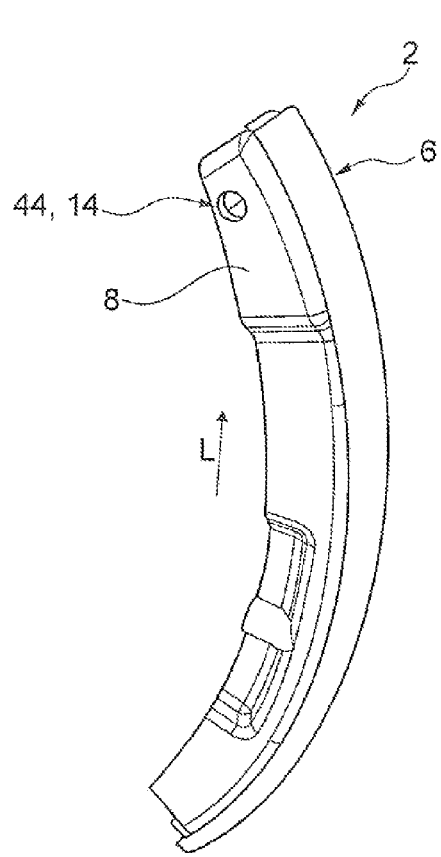
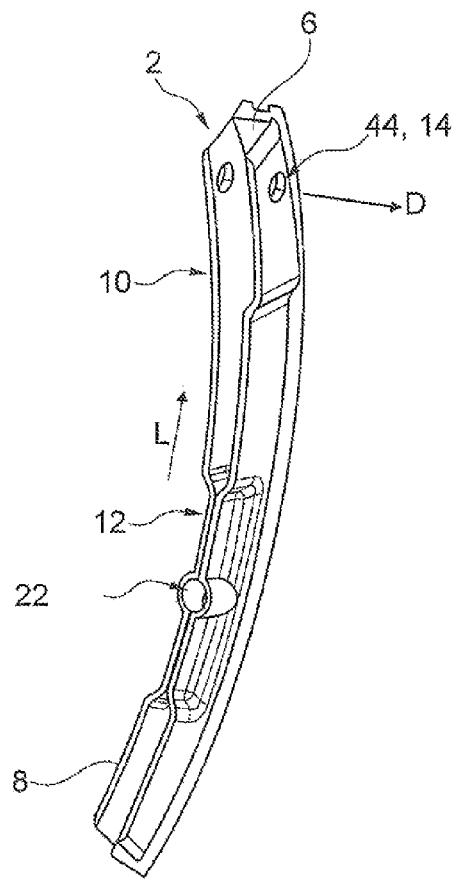
Fig. 2   Fig. 3
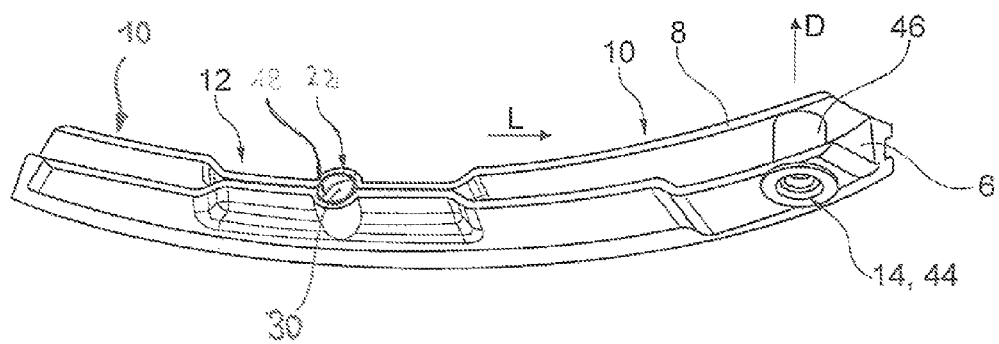
Fig. 4

TENSIONING RAIL, AND TRACTION MECHANISM DRIVE INCLUDING SUCH A TENSIONING RAIL

The present invention relates to a tensioning rail for tensioning a continuously revolving traction mechanism, the tensioning rail for tensioning the traction mechanism being arched in the longitudinal direction, the tensioning rail including a base wall and two cheeks protruding from the base wall, and the tensioning rail including at least one U-shaped profile section and one T-shaped profile section, each of which is formed by the base wall and the cheeks.

Moreover, the present invention encompasses a traction mechanism drive which includes a drive wheel situated on a drive shaft of an internal combustion engine, at least one driving wheel, a continuously revolving traction mechanism which encompasses the drive wheel and the at least one driving wheel, a tensioning rail of the above-mentioned type, and a tensioning device for transmitting a tension force to the tensioning rail.

BACKGROUND

Tensioning rails are preferably used for traction mechanism drives of internal combustion engines, such as gasoline engines or diesel engines of motor vehicles. However, they may also be used in watercraft or aircraft. The continuously revolving traction mechanism used is often designed as a chain or belt. When a chain is used, it is preferably made up of steel links.

The traction mechanism is situated between different shafts, for example between a crankshaft, one or multiple intermediate shafts, and/or one or multiple camshafts, for the force transmission. Thus, for example, force transmission may take place from a drive wheel, such as that of a crankshaft, to a driving wheel, such as that of a camshaft.

Due to the frequently fluctuating load on the traction mechanism, it is advantageous to tension the traction mechanism. For this purpose, the tensioning rail is pressed against the continuously revolving traction mechanism until the traction mechanism reaches the desired pretension. The tensioning rail generally presses on the slack span of the traction mechanism, so that the traction mechanism slides across the tensioning rail. It has proven to be advantageous if the tensioning rail is arched in the longitudinal direction. Thus, it is not possible for the traction mechanism to jam in the tensioning rail.

The tensioning rail includes a base wall and two cheeks which protrude from the base wall. The base wall at its front side may come into contact with the traction mechanism in order to tension it. The base wall facing the front side, i.e., transversely with respect to the longitudinal direction of the guide rail, often is likewise arched. In addition, on the front side the base wall may include a slide lining which comes into contact with the traction mechanism. The cheeks generally protrude from the rear side of the base wall. The cheeks are preferably situated in parallel to one another and/or symmetrically with respect to the tensioning rail. The cheeks are used for increasing the stability of the tensioning rail. In addition, the cheeks provide an advantageous option for transmitting forces for tensioning the traction mechanism to the tensioning rail.

Furthermore, it is provided that the tensioning rail includes at least one U-shaped profile section and one T-shaped profile section, each of which is formed by the base wall and the cheeks. A tensioning rail including profile sections of this type is known from Published Unexamined Patent Application US 2012/0015769 A1. A U-shaped profile section is situated between two T-shaped profile sections, viewed in the longitudinal direction. The two T-shaped profile sections each include a cross-hole for a pivot bearing. Due to the shape transition from the U-shaped profile to the particular T-shaped profile, the T-shaped profile sections are particularly advantageously suited for introducing tension forces into the tensioning rail. In practice, however, it has been found that, due to the small width of the guide rail in the particular T-shaped profile section and the cross-hole formed there for the pivot bearing, there is a risk that during operation the guide rail may tilt slightly about a longitudinal axis. To preferably prevent this, the guide rail must be manufactured very precisely. The level of effort for manufacturing such a guide rail is therefore very high.

SUMMARY OF THE INVENTION

It is an object of the present invention to provide a tensioning rail, which is preferably easily and cost-effectively manufacturable as well as dimensionally stable and functionally reliable, for tensioning a continuously revolving traction mechanism. Moreover, and alternate or additional object of the present invention is to provide a traction mechanism drive which includes such a tensioning rail.

The present invention provides that the tensioning rail includes a guide element for a pivot bearing in the U-shaped profile section. For the U-shaped profile section, the cheeks are spaced apart from one another. A guide element for the pivot bearing in this U-shaped profile section therefore has a particularly effective action against a torque about a longitudinal axis of the tensioning rail. The tensioning rail is therefore particularly robust against tilting about a longitudinal axis of the tensioning rail.

For the tensioning rail according to the present invention, it is provided that the tensioning rail in the T-shaped profile section has an enlarged contact area for contacting a tensioning device which is formed by a spacer piece inserted between the cheeks. In the T-shaped profile section, the cheeks are situated directly next to one another and/or contact one another. Due to the T-shaped design of the profile and due to the transition from the U-shaped profile section to the T-shaped profile section, the tensioning rail in the T-shaped profile section has a particularly stable design. The T-shaped profile section is therefore preferably suitable for transmitting a tension force from a tensioning device to the tensioning rail. Since the contact area is also enlarged due to the distance between the cheeks and the inserted spacer piece, the risk of the tensioning device losing contact with the tensioning rail after an extended operating period and/or under adverse operating conditions may be significantly reduced. In addition, the tension force may be transmitted in a functionally reliable manner and with lower maximum component stress on the tensioning rail in the region of the contact area. Within the context of the present invention, a contact bearing is understood to mean a bearing which results when the transmission element of the tensioning device is brought together with the spacer piece of the guide rail. The transmission element may be placed on the spacer piece for the contact bearing. When the transmission element is merely placed on the guide element for the contact bearing, it is possible for the T-shaped profile section to be acted on by the tension force only in the direction perpendicular to the T-shaped profile section. The contact bearing is therefore in particular a floating bearing. Other conceivable guide forces, such as in the transverse direction, may be disregarded in this case.

Since a U-shaped profile section and a T-shaped profile section are provided for the tensioning rail according to the present invention, the manufacture of the tensioning rail according to the present invention is particularly simple and cost-effective. At the same time, due to the guide element for the pivot bearing being situated in the U-shaped profile section, the tensioning rail according to the present invention is very dimensionally stable and robust against possible tilting about a longitudinal axis.

According to one preferred embodiment of the tensioning rail, it is provided that the base wall and the cheeks are one piece. The base wall and the cheeks may thus be designed in one piece. The manufacture is particularly simple and cost-effective, since the base wall and the cheeks may be produced, for example, from a blank with the aid of a pressing process. The associated deflections impart high stability and rigidity to the tensioning rail.

One preferred embodiment of the tensioning rail is characterized in that the spacer piece for the contact bearing is formed by a cylindrical pin. Due to the circular cross section, the provided design of the spacer piece as a cylindrical pin results in a circular contact area via which the tensioning rail may be prevented from sliding off the transmission element of the tensioning device particularly well, independently of direction. In addition, the receptacle for the spacer piece, having a corresponding shape, may be formed by two half-shells of the cheeks which together form a cylindrical receptacle. In the area of the receptacle, the cheeks therefore have the largest possible radius, which results in the lowest possible, uniform component stress on the cheeks and the spacer piece, in particular when the cylindrical pin is pressed in. In addition, except for the position of its longitudinal axis, the cylindrical pin does not have to be situated in a certain orientation in the receptacle, as the result of which an automated assembly of the tensioning rail may be simplified.

One preferred embodiment of the present invention is characterized in that the spacer piece for the contact bearing forms a flush surface with the end faces. A further enlarged flat contact area may be provided due to the provided approach, since the end faces of the cheeks may thus additionally be utilized for transmitting force from the tensioning device to the tensioning rail.

According to one alternative embodiment of the present invention, it is provided that the spacer piece protrudes beyond the T-shaped profile section of the tensioning rail. It may thus be ensured in a particularly easy manner that a transmission element of the tensioning device comes into contact with the spacer piece, i.e., with the provided contact area, in order to form the contact bearing, and does not instead come into contact with the end faces of the cheeks.

It is further provided that the spacer piece for the contact bearing is a metal pin, in particular a steel pin, and that the material of the tensioning rail is softer than that of the spacer piece. The provided metal pin has a particularly high stability, and due to its high stability may be pressed in particularly easily between the cheeks of the T-shaped profile section. For increasing the stability or hardness, the metal pin or steel pin may additionally be subjected to heat treatment.

In particular, the spacer piece may have a spherical segment-shaped contact area for force absorption, so that a force transmission from the tensioning device from different force directions is possible. This is particularly advantageous due to the fact that the tensioning rail is at least slightly pivoted during the tensioning, while the tensioning device, and thus also a piston of the tensioning device which contacts the contact area, has a fixed, unchangeable orientation.

Another preferred embodiment of the present invention is characterized in that the T-shaped profile section is situated between two U-shaped profile sections. This ensures that the tensioning rail is particularly dimensionally stable and/or robust against unintentional deflections. In addition, for a tensioning rail which includes such profile sections, particularly high forces may be transmitted from the tensioning device to the T-shaped profile section.

In the area of the U-shaped profile section of the tensioning rail, mutually coaxially situated boreholes which together form the guide element for a pivot bearing may be provided in the cheeks. In addition, a socket which is intended for the pivot bearing and/or which forms a part of this pivot bearing may be embedded in these boreholes. The pivot bearing may thus be manufactured particularly easily and precisely.

According to another aspect, the object of the present invention is achieved by a traction mechanism drive which includes a drive wheel situated on a drive shaft of an internal combustion engine, at least one driving wheel, a continuously revolving traction mechanism which encompasses the drive wheel and the at least one driving wheel, a tensioning rail according to the present invention, and a tensioning device for transmitting a tension force to the tensioning rail.

Features, details, and advantages described in conjunction with the tensioning rail according to the present invention naturally also apply in conjunction with the traction mechanism drive according to the present invention, and in each case conversely, so that reciprocal reference is or may always be made with regard to the disclosure of the individual aspects of the present invention.

BRIEF DESCRIPTION OF THE DRAWINGS

The present invention is explained below with reference to the appended figures.

FIG. 2 shows a first perspective view of the tensioning rail according to the present invention;

FIG. 3 shows a second perspective view of the tensioning rail according to the present invention; and FIG. 4 shows another perspective view of the tensioning rail according to the present invention.

DETAILED DESCRIPTION

Figure 1:
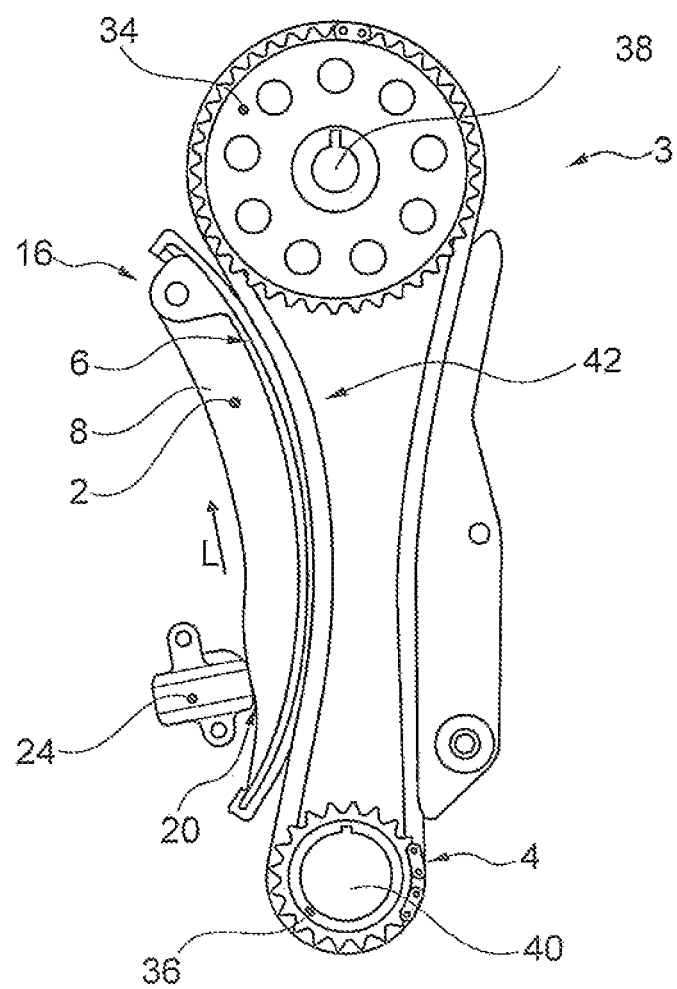
FIG. 1 shows a traction mechanism drive according to the present invention, including a tensioning rail for tensioning a traction mechanism.

FIG. 1 shows a traction mechanism drive 3 according to the present invention, including a drive wheel 34 situated on a shaft 32 of an internal combustion engine (not illustrated), and including a drive wheel 36. In principle, multiple drive wheels 34 may be provided. Traction mechanism drive 3 includes a continuously revolving traction mechanism 4 which encompasses drive wheel 34 and the at least one drive wheel 36. Due to traction mechanism 4 which is in engagement with drive wheel 34 and with drive wheel 36, mechanical power may be transferred from drive wheel 34 to drive wheel 36. The same applies for the shafts connected in each case. Traction mechanism 4 is generally designed as a chain or as a belt. If a chain is used, gearwheels are employed as wheels.

To ensure a secure revolution of traction mechanism 4, it has proven to be advantageous to tension traction mechanism 4. For this purpose, a tensioning rail 2 as illustrated in FIGS. 2 through 4 is pressed against continuously revolving traction mechanism 4 until traction mechanism 4 reaches the desired pretension. Tensioning rail 2 generally presses with a front side of a base wall 6 on slack span 42 of traction mechanism 4, so that traction mechanism 4 slides across tensioning rail 2 during operation. It has proven to be advantageous if tensioning rail 2 or base wall 6 is arched in longitudinal direction L. In other words, the front side of base wall 6 has a convex design. Thus, it is not possible for traction mechanism 4 to jam in tensioning rail 2 or in base wall 6. In addition, a fairly large contact surface for traction mechanism 4 is achieved on the front side. It may advantageously also be provided that tensioning rail 2 or base wall 6 has an arched configuration and/or design in the transverse direction on the front side facing traction mechanism 4. This ensures a particularly problem-free operation.

Base wall 6 of tensioning rail 2 is advantageously planar, so that a longitudinal extension and/or a transverse extension of base wall 6 in each case is greater than a thickness or height of base wall 6. To increase the dimensional stability of tensioning rail 2, two cheeks 8 which protrude from base wall 6 are provided for tensioning rail 2, whereby cheeks 8 and base wall 6 have such a contour in longitudinal direction L of tensioning rail 2 that together they form at least one U-shaped profile section 10 and at least one T-shaped profile section 12. Due to the corresponding contour, base wall 6 and cheeks 8 of tensioning rail 2 already impart an increased dimensional stability. In addition, cheeks 8 protrude from base wall 6, in particular preferably at a right angle or at an acute angle between 20 degrees and 90 degrees, for example, so that cheeks 8 are robust against tension forces. A parallel orientation of cheeks 8 in U-shaped profile section 10 and/or in T-shaped profile section 12 also ensures a good force distribution on base wall 6. Cheeks 8 may be connected to one another in T-shaped profile section 12 in an integrally joined, form-locked, and/or force-fit manner. This increases the torsional rigidity of tensioning rail 2. Cheeks 8 are advantageously situated on a rear side or on a side of base wall 6 facing away from traction mechanism 4. This configuration ensures a particularly simple introduction of tension forces and prevents cheeks 8 from jamming on traction mechanism 4.

U-shaped profile section 10 formed by cheeks 8 includes a guide element 14 for a pivot bearing 16. A corresponding rotation axis D is oriented transversely with respect to a longitudinal direction L of tensioning rail 2. When tensioning rail 2 is used for traction mechanism drive 4, tensioning rail 2 is rotatably fastened to a bearing counterpart, for example a shaft, of the pivot bearing with the aid of guide element 14. Such bearing counterparts for pivot bearings are known from the prior art. When tensioning rail 2 is assembled or installed, guide element 14 may be regarded as part of pivot bearing 16. In the area of guide element 14, cheeks 8 which are spaced apart from one another ensure high torsional rigidity of tensioning rail 2 about its longitudinal axis L. When tensioning rail 2 is rotatably fastened to the bearing counterpart, cheeks 8 ensure a precise alignment of tensioning rail 2. This ensures a problem-free operation.

As is apparent from FIG. 3, cheeks 8 have a cross-hole 44 in each of U-shaped profile sections 10. Cross-holes 44 are aligned coaxially with respect to one another. In a simple embodiment, these cross-holes 44 may form guide element 14 in U-shaped profile section 10 of tensioning rail 2.

An alternative or expanded embodiment of guide element 14 in U-shaped profile section 10 of tensioning rail 2 is illustrated in FIG. 4. A cylindrical sleeve 46 extends between cheeks 8. Sleeve 46 may adjoin boreholes 44 and/or may be bordered by same. Sleeve 46 is preferably joined to cheeks 8 in an integrally joined, force-fit, and/or form-locked manner. In this case, sleeve 46 and/or boreholes 44 form guide element 14 in U-shaped profile section 10 of tensioning rail 2. The stability of tensioning rail 2 is further increased when sleeve 46 is made of a hardened material such as steel. In addition, sleeve 46 is particularly resistant and undergoes little wear.

It is apparent from FIG. 3 that in one section, tensioning rail 2 in T-shaped profile section 12 has a receptacle 22 made up of two half-shells in which a spacer piece 18 for a contact bearing 20 is provided. Spacer piece 18 for contact bearing 20 is designed as a cylindrical pin, while receptacle 22 is circular. As likewise shown in FIG. 3, receptacle 22 is shaped or formed by cheeks 8. Similarly, receptacle 22 may have a two-part design. If cheeks 8 are produced from a flat blank by a shaping process, in particular with the aid of bending, receptacle 22 may also be produced in a particularly simple way. For this purpose, a corresponding cylindrical negative mold may be used to place cheeks 8 in T-shaped profile section 12. The negative mold may be subsequently removed.

Cylindrical receptacle 22 is open at an end-face side so that spacer piece 18, which is formed here by a metal pin, particularly preferably a steel pin, and introduced into receptacle 22, may be pressed in. The opposite end-face side of receptacle 22 preferably includes a stop which is formed by base wall 6 and/or by receptacle 22 itself.

In FIG. 4, receptacle 22 explained above is expanded by metal pin 18, particularly preferably a steel pin, which is bordered by receptacle 22. The metal pin is dimensioned with respect to length and formed on the end-face side in such a way that a flush surface results as a complement to the end faces of cheeks 8. Alternatively, the metal pin may be slightly longer than receptacle 22 so that it protrudes slightly beyond the longitudinal edges of cheeks 8 in the area of receptacle 22, and tensioning device 2 may be brought into contact with metal pin 18 in a particularly simple manner. Metal pin 18 is used for absorbing and transmitting tension forces from tensioning device 24 to traction mechanism 4 via tensioning rail 2. The robustness of tensioning rail 2 is increased due to metal pin 18, in particular when metal pin 18 is particularly hardened and/or has a high rigidity.

The end face which forms contact area 30 of spacer piece 18, or, in the present exemplary embodiment, of metal pin 18, may preferably have a spherical segment-shaped design, so that the introduction of force into spacer piece 18 and the associated component stresses on spacer piece 18 are preferably independent of direction. Alternatively, the end face of the spacer piece may be oriented flatly and in particular perpendicularly with respect to the longitudinal axis of the spacer piece, so that a preferably flat contact area may be achieved as a complement to the end faces of the cheeks.

The spacer piece 18 may be pressed, glued, or fastened in receptacle 22 in some other way, so that the spacer piece is preferably held captively on tensioning rail 2 after installation. In addition, receptacle 22 and spacer piece 18 may also have other cross-sectional shapes, which may also be adapted to the shape of the adjoining transmission elements of tensioning device 24. Furthermore, the shape of spacer piece 18 may also be designed for a simple and cost-effective manufacturing method, and may already be inserted between cheeks 8 during the shaping of tensioning rail 2, so that spacer piece 18 itself virtually forms the negative shape of receptacle 22, and receptacle 22 is virtually pressed against spacer piece 18 during the shaping.

Spacer piece 18 may also be formed from a hardening filler compound, which is pressed into receptacle 22 as a shapeable compound and does not harden into a solid body until it is in receptacle 22. In addition, spacer piece 18 may also be designed as a cover or lid which is placed, screwed, or mounted in some other way on receptacle 22, and which at least partially covers the end faces of cheeks 8. In the design of spacer piece 18, it is important only that spacer piece 18 at least partially closes receptacle 22 which is open toward the outside, so that the surface area of receptacle 22 may be utilized, at least partially, as a contact area for the transmission element of tensioning device 24.

LIST OF REFERENCE NUMERALS 2 tensioning rail
3 traction mechanism drive
4 traction mechanism
6 base wall
8 cheeks
10 U-shaped profile section
12 T-shaped profile section
14 guide element
16 pivot bearing
18 spacer piece
20 contact bearing
22 receptacle
24 tensioning device
30 contact area
34 drive wheel
36 driving wheel
38 shaft
40 shaft
42 slack span
44 cross-hole
46 sleeve
D rotation axis
L longitudinal direction of the tensioning rail

What is claimed is:

1. A tensioning rail for tensioning a continuously revolving tractioner, the tensioning rail for tensioning the tractioner being arched in the longitudinal direction, the tensioning rail comprising:
    a base wall and two cheeks protruding from the base wall, at least one U-shaped profile section and one T-shaped profile section, each being formed by the base wall and the cheeks,
    the tensioning rail in the U-shaped profile section including a guide element for a pivot bearing, and
    the tensioning rail with aid of the cheeks forming a receptacle in the T-shaped profile section, a spacer piece being inserted in the receptacle in order to form an enlarged contact area for contacting a tensioner.

2. The tensioning rail as recited in claim 1 wherein the base wall and the cheeks are one piece.

3. The tensioning rail as recited in claim 1 wherein the spacer piece for a contact bearing is formed by a cylindrical metal pin.

4. The tensioning rail as recited in claim 1 wherein the spacer piece for a contact bearing forms a flush surface with end faces of the cheeks.

5. The tensioning rail as recited in claim 1 wherein the spacer piece protrudes beyond the T-shaped profile section of the tensioning rail.

6. The tensioning rail as recited in claim 5 wherein the spacer piece for a contact bearing has a spherical segment-shaped contact area for force absorption.

7. The tensioning rail as recited in claim 1 wherein the T-shaped profile section is situated between two U-shaped profile sections of the at least one U-shaped profile section.

8. A traction mechanism drive comprising:
    a drive wheel situated on a drive shaft of an internal combustion engine;
    at least one driving wheel;
    a continuously revolving tractioner encompassing the drive wheel and the at least one driving wheel;
    the tensioning rail as recited in claim 1 for tensioning the tractioner; and
    a tensioner for transmitting a tension force to the tensioning rail.

* * * * *